(12) United States Patent
Parker

(10) Patent No.: US 8,235,450 B2
(45) Date of Patent: Aug. 7, 2012

(54) VEHICLE COVER RESTRAINT SYSTEM

(76) Inventor: M. Lawrence Parker, Kalamazoo, MI (US)

( * ) Notice: Subject to any disclaimer, the term of this patent is extended or adjusted under 35 U.S.C. 154(b) by 152 days.

(21) Appl. No.: 12/846,269

(22) Filed: Jul. 29, 2010

(65) Prior Publication Data

US 2011/0025089 A1  Feb. 3, 2011

Related U.S. Application Data

(60) Provisional application No. 61/271,988, filed on Jul. 29, 2009.

(51) Int. Cl.
*B60J 7/20* (2006.01)
(52) U.S. Cl. ............... 296/136.13; 296/136.01; 150/166
(58) Field of Classification Search .................. 296/95.1, 296/136.01, 136.07, 136.1, 136.13; 150/166, 150/167
See application file for complete search history.

(56) References Cited

U.S. PATENT DOCUMENTS

| | | | | |
|---|---|---|---|---|
| 5,029,933 A | * | 7/1991 | Gillem | 296/136.11 |
| 5,845,958 A | * | 12/1998 | Rudys et al. | 296/136.08 |
| 5,941,593 A | * | 8/1999 | McCann | 296/136.1 |
| 6,070,629 A | * | 6/2000 | Whiteside | 150/166 |
| 7,229,121 B2 | * | 6/2007 | Fox et al. | 296/100.16 |
| 2002/0125730 A1 | * | 9/2002 | Burks et al. | 296/98 |
| 2009/0066112 A1 | * | 3/2009 | Sharapov | 296/136.1 |

* cited by examiner

*Primary Examiner* — Lori Lyjak
(74) *Attorney, Agent, or Firm* — Watson I.P. Group, PLC; Jovan N. Jovanovic; Vladan M. Vasiljevic

(57) ABSTRACT

A cover system for a vehicle comprising a vehicle cover and a first retaining cord. The vehicle cover is configurable to cover a vehicle to the extent desired. The first retaining cord comprises a cord member, a first clip and a second clip. The first clip is coupled to the vehicle cover in a spaced apart orientation relative to the second clip. The cord member extends between the first clip and the second clip to maintain the vehicle cover in the desired orientation.

12 Claims, 4 Drawing Sheets

VEHICLE COVER RESTRAINT SYSTEM

CROSS-REFERENCE TO RELATED APPLICATION

The present application claims priority from U.S. Provisional Patent Application Ser. No. 61/271,988 filed Jul. 29, 2009, entitled "Vehicle Cover Restraint System," the entire specification of which is hereby incorporated by reference in its entirety.

BACKGROUND OF THE DISCLOSURE

1. Field of the Disclosure

The disclosure relates in general to vehicle covers, and more particularly, to a vehicle cover restraint system.

2. Background Art

The use of vehicle covers is well known. Often, such covers are placed over cars that will be exposed to the elements. In other circumstances, the covers are placed over cars that are not driven often to minimize dust that can accumulate on the vehicle.

Vehicle covers often include an elastic portion that extends about the bottom edge of the cover. This elastic portion is intended to contract the opening of the vehicle cover when the vehicle cover is placed on the vehicle. Thus, portions of the vehicle cover become positioned below the front fender, and the rear fender, in an effort to maintain the vehicle cover in the proper orientation. Often an eyelet is placed on opposing sides at a point substantially corresponding to the middle of the vehicle. A cable or other cord-like member can be extended through the eyelets. Generally the cord-like member can be coupled to a lock of some type to prevent theft of the cover.

Problematically, the covers typically are not suitable for use in inclement weather. Often even a gentle breeze can dislodge the car cover or reorient the cover. For example, even a slight breeze can blow through the opening, rendering the cover much like a sail capturing the wind. When the cover is dislodged or reoriented, the cover ceases to operate properly, and can be lost or damaged. Additionally, in certain circumstances, it can even damage the vehicle that it was intended to protect.

SUMMARY OF THE INVENTION

The disclosure is directed to a cover system for a vehicle comprising a vehicle cover and a first retaining cord. The vehicle cover is configurable to cover a vehicle to the extent desired. The first retaining cord comprises a cord member, a first clip and a second clip. The first clip is coupled to the vehicle cover in a spaced apart orientation relative to the second clip. The cord member extends between the first clip and the second clip to maintain the vehicle cover in the desired orientation.

In a preferred embodiment, a second retaining cord is provided that comprises a cord member, a first clip and a second clip. In such an embodiment, the first clip is coupled to the vehicle cover in a spaced apart orientation relative to the second clip. The cord member extends between the first clip and the second clip to maintain the vehicle cover in the desired orientation.

In another preferred embodiment, the cord member comprises an elastic cord.

In yet another preferred embodiment, the elastic cord further includes a hook member coupled to either end of the elastic cord. In such an embodiment, each hook member is attachable to a respective first clip and second clip.

In a preferred embodiment, the cord member comprises a substantially non-elastic cord.

Preferably, at least one of the first clip and the second clip comprise a base, a first leg, a second leg and a locking member. The base has an eyelet. The first leg extends from the base and a second leg extends from the base. The first and second legs extending outwardly from the base at an angle to each other such that a distal end of the first and second legs are spaced apart from each other. The distal ends of the first and second legs define a gripper arm. The locking member extends about the first and second legs. The locking member translates along the first and second legs so as to drive the gripper arms toward each other, and into engagement.

In a preferred embodiment, the vehicle comprises one of the group consisting of: cars, light trucks, boats, RVs, garden tractors, ATVs, personal watercraft, kayaks, canoes, outdoor furniture, barbeque grilles, bikes, motorcycles, air conditioners, picnic tablecloths, and tarps.

In another aspect of the invention, the invention comprises a method of affixing a vehicle cover restraint system of claim 1 to a vehicle comprising the steps of: positioning the vehicle cover over the vehicle defining a first retaining region on either side of the vehicle and a second retaining region on either side of the vehicle; extending the first retaining cord under the vehicle from the first retaining region on one side of the vehicle to the first retaining region on the other side of the vehicle; and extending the second retaining cord under the vehicle from the second retaining region on one side of the vehicle to the second retaining region on the other side of the vehicle.

In one preferred embodiment, the step of extending the first retaining cord comprises the steps of: affixing a first clip to the first retaining region on one side of the vehicle; affixing a second clip to the first retaining region on the other side of the vehicle; and coupling a cord member to the first clip and to the second clip.

In another preferred embodiment, the step of extending the second retaining cord comprises the steps of: affixing a first clip to the second retaining region on one side of the vehicle; affixing a second clip to the second retaining region on the other side of the vehicle; and coupling a cord member to the first clip and the second clip.

Preferably, the step of extending the first retaining cord or the step of extending the second retaining cord further comprises the step of adjusting the retaining cord.

BRIEF DESCRIPTION OF THE DRAWINGS

The disclosure will now be described with reference to the drawings wherein.

DETAILED DESCRIPTION OF THE DISCLOSURE

Figure 1:
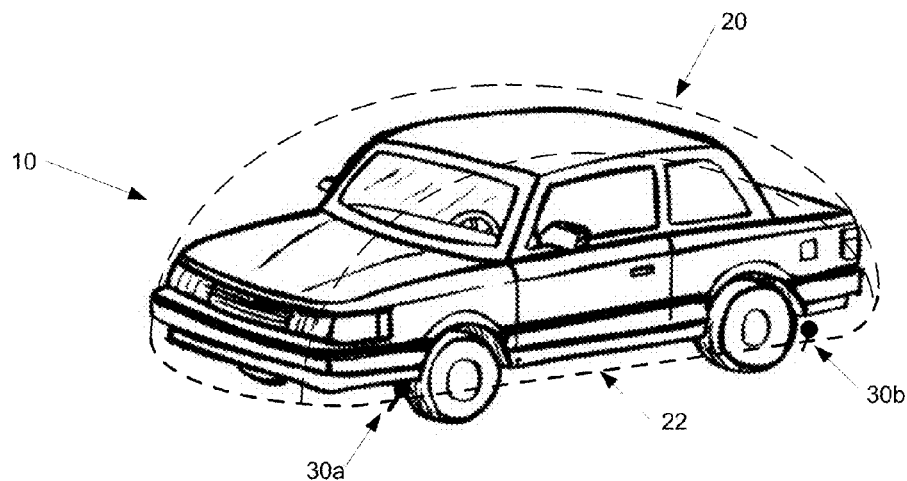
FIG. 1 of the drawings is a perspective view of a vehicle having a vehicle cover restraint system of the present invention.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the vehicle cover restraint system is shown generally at 10. The vehicle cover restraint system is shown for use in association with an automobile. However, it will be understood that the system may be utilized with other vehicles, such as cars, light trucks, boats, RVs, garden tractors, ATVs, personal watercraft, kayaks, canoes, outdoor furniture, barbeque grilles, bikes, motorcycles, air conditioners, picnic tablecloths, tarps, without limitation. Thus, regardless of its conventional meaning, the term vehicle shall apply to all of the foregoing items identified which can be covered.

Figure 2:
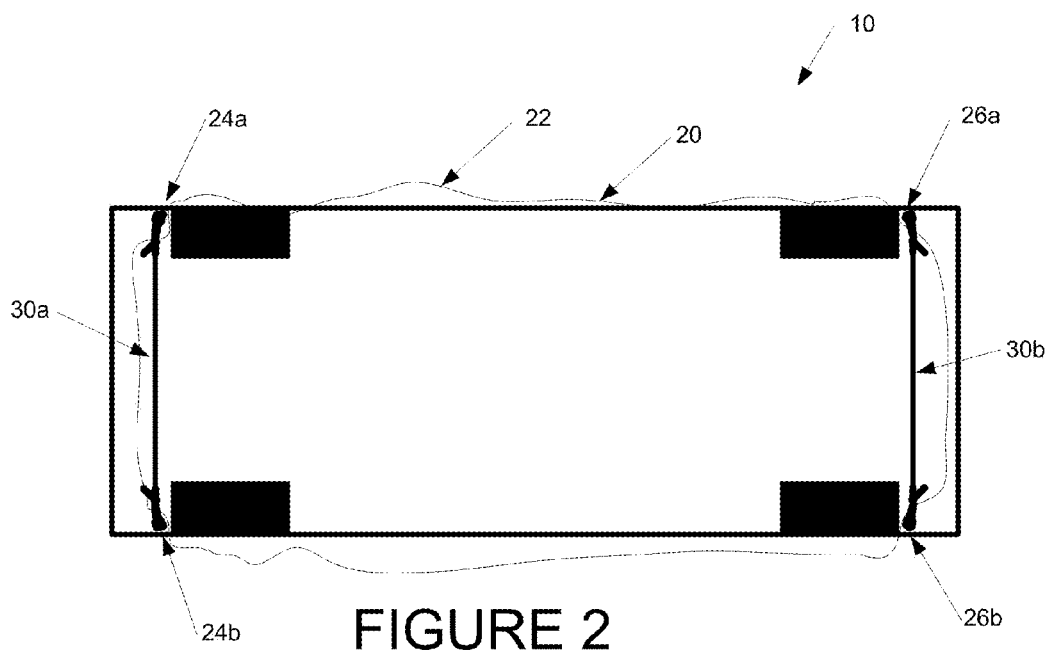
FIG. 2 of the drawings is a bottom plan view of a vehicle having a vehicle cover restraint system of the present invention installed thereon.

In particular, and with additional reference to FIG. 2, the vehicle cover restraint system 10 includes vehicle cover 20, first restraining cord 30a and second restraining cord 30b. The two restraining cords cooperate to maintain the vehicle cover in the proper position and orientation. The vehicle cover 20 comprises any one of a number of car covers that are commercially available. Typically the car covers include a fabric cover of any one of a number of different materials. The vehicle cover also includes a bottom edge 22 that typically, but not in all instances, includes an elastic member that contracts the lower opening so that the cover remains on the vehicle.

The cover further includes two retaining regions on either side of the vehicle. The first retaining region 24a is just in front of the front tire, and the second retaining region 26a is just behind the back of the tire. It will be understood that on the opposite side of the vehicle are corresponding first retaining region 24b and second retaining region 26b.

Figure 3:
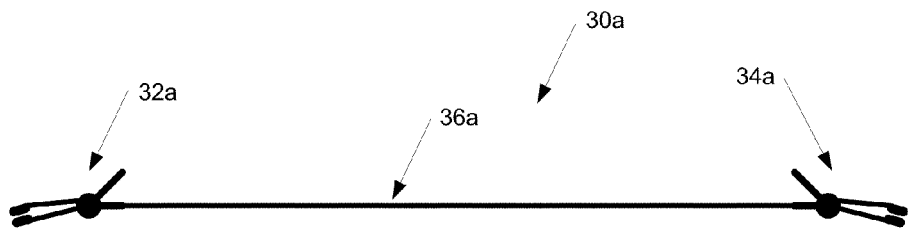
FIG. 3 of the drawings is a side elevational view of a first retaining cord for use in association with the cover restraint system of the present invention.

The first retaining cord 30a is shown in FIG. 3 as comprising cord member 36a with a first clip 32a located at a first end and a second clip 34a located at the second end. The first retaining cord 30a has sufficient length to reach (in an at least a partially stretched configuration) from the first retaining region 24a (FIG. 2) to the first retaining region 24b (FIG. 2) on the opposite side of the vehicle.

Figure 4:
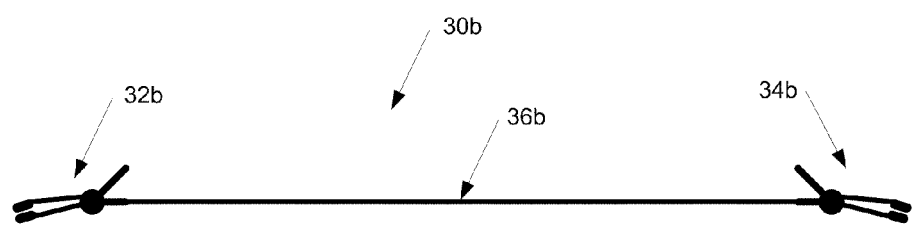
FIG. 4 of the drawings is a side elevational view of a first retaining cord for use in association with the cover restraint system of the present invention.

Similarly, the second retaining cord 30b is shown in FIG. 4 as comprising elastic member 36b with a first clip 32b located at a first end and a second clip 34b located at the second end. The cord 30b has sufficient length to reach (in an at least a partially stretched configuration) from the first retaining region 26a (FIG. 2) to the first retaining region 26b (FIG. 2) on the opposite side of the vehicle.

While a number of different clip members and cord members are contemplated, particularly useful embodiments will be shown as being illustrative of the disclosure. Specifically, and with reference to FIG. 5, a suitable first clip 32a is shown. It will be understood that second clip 34a, first clip 32b and second clip 34b are substantially identical. As such, the clip 32a will be described with the understanding that the remaining clips are substantially identical.

Figure 5:
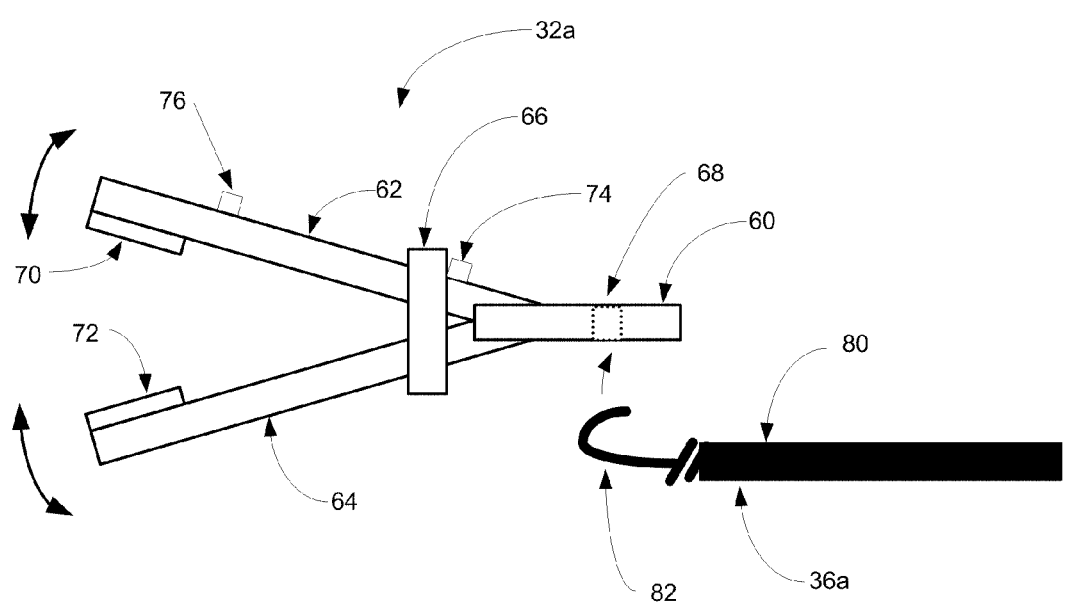
FIG. 5 of the drawings is a side elevational view of a clip for use in association with the cover restraint system of the present invention.

Clip 32a is shown in FIG. 5 as comprising base 60, first leg 62, second leg 64 and locking member 66. The first leg and the second leg extend angularly outward from the base 60. The first leg 62 terminates at gripper arm 70 and the second leg 64 terminates at gripper arm 72, which are spaced apart from each other a predetermined distance. Locking member 66 comprises a hoop of material that straddles the first and second legs and can be translated along the legs between inner stop 74 and outer stop 76. Thus, as the locking member extends across the first and second legs toward the gripper arms, the two gripper arms are directed toward and into contact with each other. The natural biasing force outward of the first and second legs maintain the locking member in position, and the locking member essentially biases the two gripper arms against each other.

With reference to FIG. 5, cord member 36a (and cord member 36b) may comprise an elastic cord 80 member having a hooks, such as hook 82, affixed to the elastic cord at either end thereof, respectively. The hooks extend through eyelet 68 in the base 60 of the respective clip 32, for example.

In another embodiment, the cord member may comprise a substantially non-elastic cord, such as a nylon cord. In such an example, one end of the cord can be tied to a clamp and the other end can be threaded through an eyelet in another clamp, such as eyelet 68 of the clamp shown in FIG. 5, and a cinching loop/adjuster (not shown). A cinching loop/adjuster can also be utilized in embodiments where an elastic cord is utilized.

It will be understood that a number of different cord members can be utilized, and a number of different clips can be utilized, without limitation. Indeed, other embodiments may include fully integrated clips with the elastic members, whereas other embodiments will have differing separate clips and elastic members. For the embodiments described, the cord member may be adjusted in length (i.e., the distance between the two clips). In other embodiments, the clips can first be mounted and secured to the vehicle cover, then the elastic member is coupled thereto. Preferably, the two retaining cords are packaged together as a single unit for purchase by consumers.

In operation, the user first obtains a vehicle cover 20. The vehicle cover is placed over the vehicle in the proper orientation. Once the cover is positioned, the user can select a first retaining cord and a second retaining cord of suitable length. The user secures the first clip 32a of the first retaining cord 30a to the first retaining region 24a on the first side of the vehicle. Next, the user secures the second clip 34a of the first retaining cord 30a to the first retaining region 24b of the second side of the vehicle. Once secured, the user, in certain embodiments can further tighten the elastic so as to increase the force with which the elastic cord pulls the two clips toward each other.

Similarly, the user then selects the second retaining cord 30b. The user retains the first clip 32b of the second retaining cord 30b to the second retaining region 26a of the first side of the vehicle. Subsequently, the user secures the second clip 34b of the second retaining cord 30b to the second retaining region 26b on the second side of the vehicle. Once this is likewise secured, the user, again in certain embodiments, can further tighten the elastic so as to increase the force with which the elastic cord pulls the two clips toward each other.

In other embodiments, the clip members are first applied to the proper orientation on the cover and subsequently the cord members are coupled to the desired respective clip members. Of course, other combinations of attaching the clip members to the cover and attaching the cord members to the clip members are contemplated.

Figure 6:
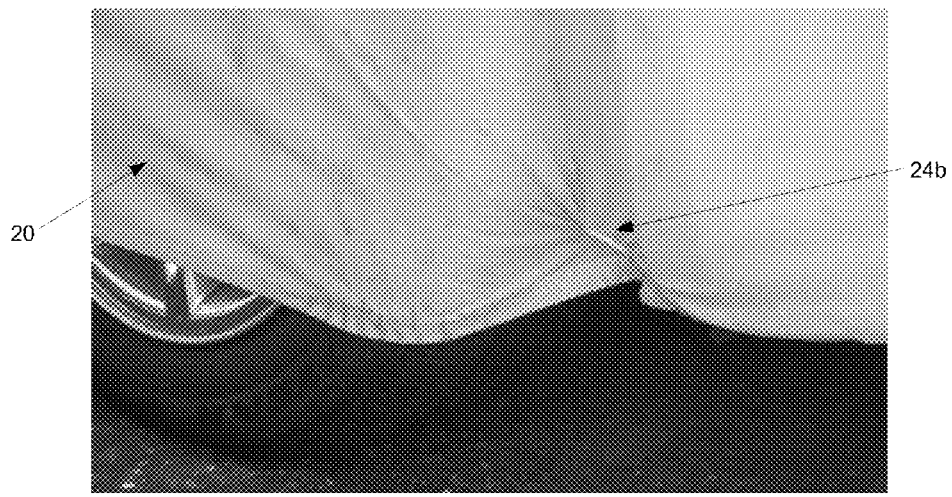
FIG. 6 of the drawings is a perspective view of the cover restraint system of the present invention in use.
Figure 7:
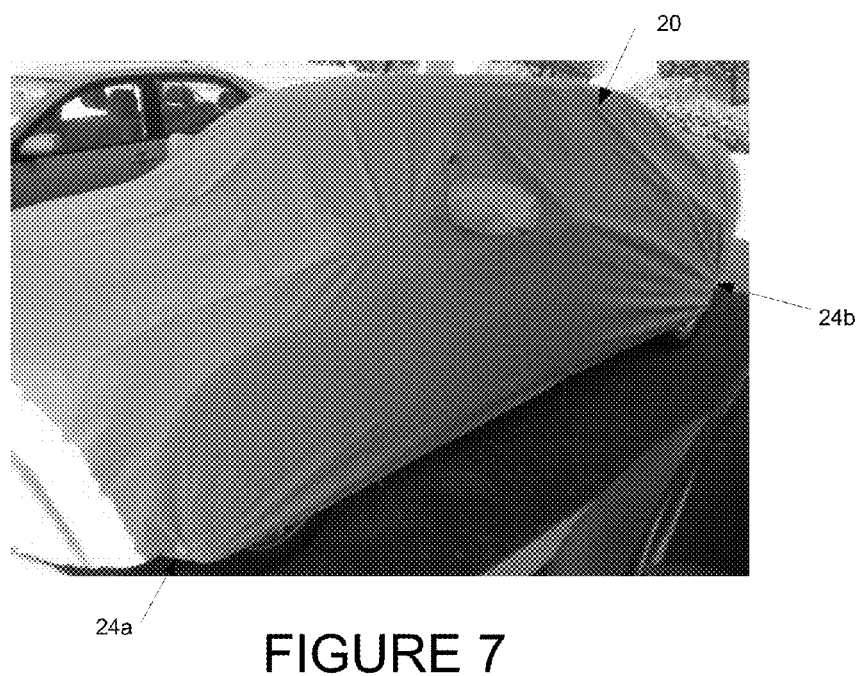
FIG. 7 of the drawings is a perspective view of the cover restraint system of the present invention in use.

Advantageously, in such a configuration, and with reference to FIGS. 6 and 7, the car cover remains properly positioned and oriented on the vehicle despite the weather conditions. Indeed, even in rather windy conditions, the cover remains in the proper orientation. To remove the retaining cords, the opposite operations are executed. Once the retaining cords have been removed, the cover can be removed and stowed as with any other commercially available cover.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A cover system for a vehicle comprising:
    a vehicle cover configurable to cover a vehicle to the extent desired;
    a first retaining cord comprising a cord member, a first clip and a second clip, the cord member being separate from the vehicle cover and coupled thereto only through the first clip and the second clip, wherein the first clip is coupled to the vehicle cover in a spaced apart orientation relative to the second clip, the cord member extends between the first clip and the second clip to maintain the vehicle cover in the desired orientation.

2. The cover system for a vehicle of claim 1 further comprising a second retaining cord comprising a cord member, a first clip and a second clip, the first clip coupled to the vehicle cover in a spaced apart orientation relative to the second clip, the cord member extending between the first clip and the second clip to maintain the vehicle cover in the desired orientation.

3. The cover system for a vehicle of claim 1 wherein the cord member comprises an elastic cord.

4. The cover system for a vehicle of claim 3 wherein the elastic cord further includes a hook member coupled to either end of the elastic cord, each hook member attachable to a respective first clip and second clip.

5. A cover system for a vehicle comprising:
    a vehicle cover configurable to cover a vehicle to the extent desired;
    a first retaining cord comprising a cord member, a first clip and a second clip, the first clip coupled to the vehicle cover in a spaced apart orientation relative to the second clip, the cord member extending between the first clip and the second clip to maintain the vehicle cover in the desired orientation, wherein the cord member comprises a substantially non-elastic cord.

6. A cover system for a vehicle comprising:
    a vehicle cover configurable to cover a vehicle to the extent desired;
    a first retaining cord comprising a cord member, a first clip and a second clip, the first clip coupled to the vehicle cover in a spaced apart orientation relative to the second clip, the cord member extending between the first clip and the second clip to maintain the vehicle cover in the desired orientation, wherein at least one of the first clip and the second clip comprise:
    a base having an eyelet;
    a first leg extending from the base and a second leg extending from the base, the first and second legs extending outwardly from the base at an angle to each other such that a distal end of the first and second legs are spaced apart from each other, wherein the distal ends of the first and second legs define a gripper arm;
    a locking member extending about the first and second legs, the locking member translating along the first and second legs so as to drive the gripper arms toward each other, and into engagement.

7. The cover system for a vehicle of claim 1 wherein the vehicle comprises one of the group consisting of: cars, light trucks, boats, RVs, garden tractors, ATVs, personal watercraft, kayaks, canoes, outdoor furniture, barbeque grilles, bikes, motorcycles, air conditioners, picnic tablecloths, and tarps.

8. A method of affixing a vehicle cover restraint system of claim 1 to a vehicle comprising the steps of:
    positioning the vehicle cover over the vehicle;
    defining a first retaining region on either side of the vehicle and a second retaining region on either side of the vehicle;
    extending the first retaining cord under the vehicle from the first retaining region on one side of the vehicle to the first retaining region on the other side of the vehicle, the first retaining cord being separate from the vehicle cover and wherein a first end of the first retaining cord is coupled to one of the first retaining regions of the vehicle cover and wherein a second end of the first retaining cord is coupled to the other of the first retaining regions, and otherwise free of coupling with the vehicle cover; and
    extending the second retaining cord under the vehicle from the second retaining region on one side of the vehicle to the second retaining region on the other side of the vehicle, the second retaining cord being separate from the vehicle cover and wherein a first end of the second retaining cord is coupled to one of the second retaining regions of the vehicle cover and wherein a second end of the second retaining cord is coupled to the other of the second retaining regions, and otherwise free of coupling with the vehicle cover.

9. The method of claim 8 wherein the step of extending the first retaining cord comprises the steps of:
    affixing a first clip to the first retaining region on one side of the vehicle;
    affixing a second clip to the first retaining region on the other side of the vehicle; and
    coupling a cord member to the first clip and to the second clip.

10. The method of claim 9 wherein the step of extending the second retaining cord comprises the steps of:
    affixing a first clip to the second retaining region on one side of the vehicle;
    affixing a second clip to the second retaining region on the other side of the vehicle; and
    coupling a cord member to the first clip and the second clip.

11. The method of claim 8 wherein the step of extending the first retaining cord or the step of extending the second retaining cord further comprises the step of adjusting the retaining cord.

12. The method of claim 8 wherein the vehicle comprises one of the group consisting of: cars, light trucks, boats, RVs, garden tractors, ATVs, personal watercraft, kayaks, canoes, outdoor furniture, barbeque grilles, bikes, motorcycles, air conditioners, picnic tablecloths, and tarps.

* * * * *